June 2, 1942.   E. L. MALHIOT   2,285,166
TENSION GAUGE
Filed Jan. 11, 1940
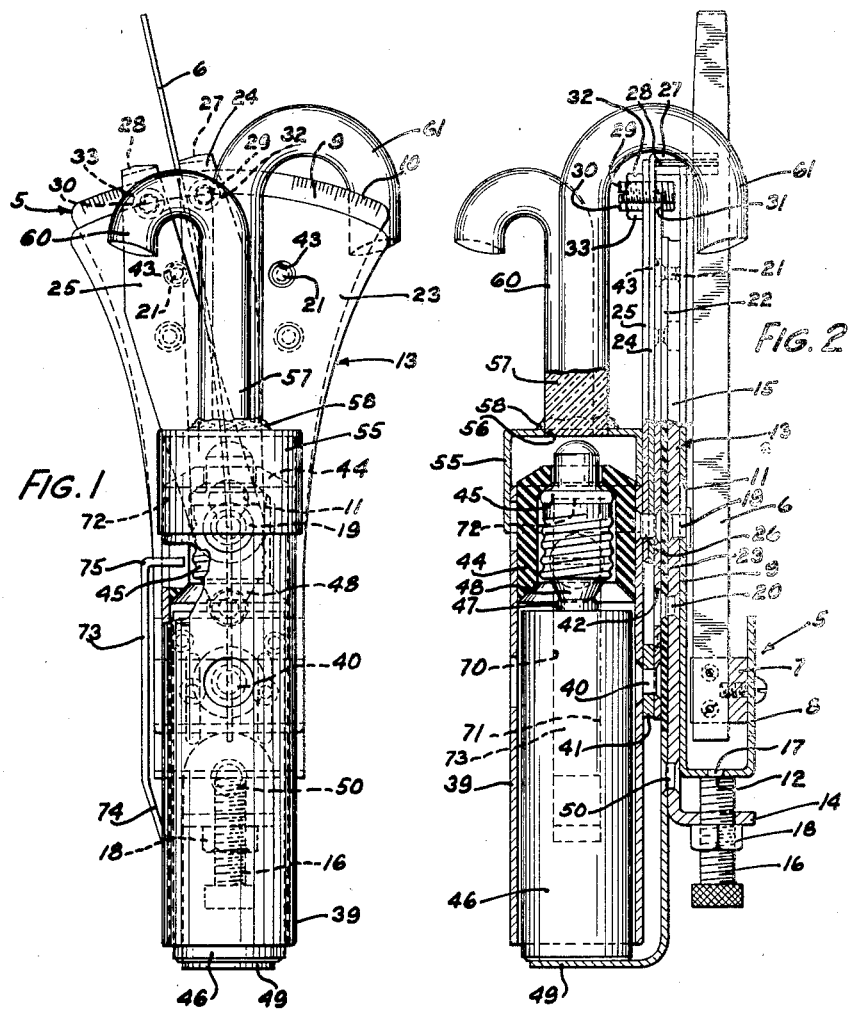
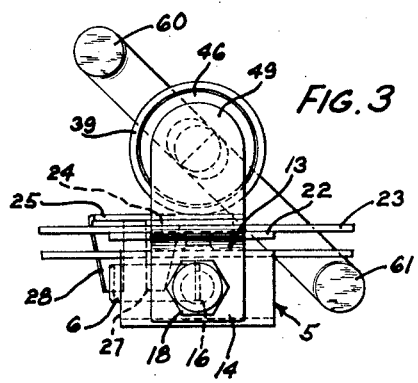
INVENTOR
E. L. MALHIOT
BY Emery Robinson
ATTORNEY Patented June 2, 1942

2,285,166

UNITED STATES PATENT OFFICE 2,285,166

TENSION GAUGE

Eugene L. Malhiot, Maywood, Ill., assignor to Western Electric Company, Incorporated, New York, N. Y., a corporation of New York Application January 11, 1940, Serial No. 313,339

5 Claims. (Cl. 265—18)

This invention relates to tension gauges and more particularly to an adjustable electrical tension gauge.

In the electrical industry, it is quite frequently necessary to adjust contact springs of relays and similar equipment so that the contacts will be held, in the case of normally made contacts, against their associated contacts under a predetermined pressure and in the case of normally open contacts, the springs must be adjusted so that they will be held open until a predetermined pressure is applied to the movable contact. This is usually done by bending the springs which support the contacts and measuring the tension of the springs with a gauge, usually calibrated in terms of grams. Considerable difficulty has been experienced in that the person adjusting the contact springs must watch both the contacts and the gauge at the same time to determine what pressure is exerted by one contact on another.

It is an object of the present invention to provide a simple and readily adjustable gauge which will give a visual indication when the pressure on the gauge spring is within predetermined limits.

In accordance with one embodiment of the invention, a gauge having a scale graduated in terms of grams and having a leaf spring of a known resiliency and movable over the scale is provided with an adapter plate which may be readily mounted upon the framework of the gauge and which carries a pair of contact arms settable in any desired position with respect to the scale for engaging the leaf spring which serves as a contact. Mounted upon the adapter plate is a tubular member for receiving a small dry battery and an electric lamp. One terminal of the battery is electrically in contact with the leaf spring and the tubular member is insulated from the leaf spring. A switch is provided for connecting one terminal of the electric lamp to the pair of contacts which are adjustable over the face of the scale whereby, when the mechanism is in use, a circuit will be completed from one terminal of the lamp to the contacts and if the leaf spring is in engagement with either of the two contacts, the lamp will remain lighted.

A better understanding of the invention will be had by reference to the following description when considered in conjunction with the accompanying drawing, wherein Fig. 1 is a front elevational view of a gauge embodying the features of the present invention;

Fig. 2 is a side elevational view of the gauge shown in Fig. 1, parts being broken away to more clearly illustrate the details of construction of the gauge, and Fig. 3 is an end elevational view, looking upwardly, at the bottom of the apparatus as shown in Fig. 1.

Referring to the drawing, wherein like reference characters designate the same parts throughout the several views, a mechanical gram gauge, designated generally by the numeral 5, which is of the type usually used in adjusting contact springs for the proper tension, comprises a leaf spring 6 of known resiliency fixed in a supporting block 7, which is, in turn, mounted upon a bent portion 8 of a scale plate 9. The scale plate 9 has a scale 10 inscribed thereon, which is graduated in terms of grams and normally the leaf spring 6 is in the exact center of the scale, which is the zero position thereon. When the tip of the spring 6 is engaged with a contact spring (not shown), the tension of which is to be measured, the amount of deflection of the spring will indicate on the scale the pressure necessary to either move the contact spring into engagement with its associated contact or to break it from engagement with its associated contact.

The apparatus, described thus far, is the usual mechanical gram gauge ordinarily used to determine the tension of contact springs and has been modified by making a bayonet slot 11 in the scale plate 9 and an aperture 12 in the horizontally extending portion of the scale plate, whereby an adapter plate 13 may be mounted on the scale plate 9. The adapter plate 13 comprises a horizontally disposed portion 14 and a vertically disposed portion 15. The horizontally disposed portion 14 of the adapter plate 13 has a thumb screw 16 threaded in it, which is provided with a reduced portion 17 adapted to enter the aperture 12 in the horizontally disposed portion of the scale plate 9. A lock nut 18 is threaded on the thumb screw 16 and after a headed rivet 19 fixed in the vertical portion 15 of the adapter plate 13 has been inserted in the bayonet slot 11 in the scale plate 9 and forced downwardly to locking position, the reduced portion 17 of the screw 16 may be set into the aperture 12 and the adapter plate to lock the adapter plate on the scale plate 9.

Mounted upon the adapter plate 13, by means of rivets 20 and 21, is an insulator plate 22, which serves to support a contact plate 23 on which adjustable contacts 24 and 25 are pivoted on a pivot pin 26.

The contacts 24 and 25 are in the form of L-shaped levers having horizontally extending portions 27 and 28, respectively, which contact with the leaf spring 6 and are sharpened at their edges to make a good electrical contact with the leaf spring. The upper end of the contact plate 23 is curved on an arc of a circle, whose center would be approximately at the pivot pin 26, and the contacts 24 and 25 may be moved to any desired position along the face of the contact plate and secured to the contact plate by means of a pair of screws 29 and 30, respectively, which are slotted, as shown at 31, to engage the upper edge of the contact plate 23. The screws 29 and 30 pass through the upper ends of the springs 24 and 25, respectively, and are threaded to receive locking nuts 32 and 33, respectively, whereby after the contacts 24 and 25 have been moved to the desired position, they may be locked in that position by tightening the locking nuts on their respective screws.

The pivot pin 26 passes through the contact plate 23, the contacts 24 and 25 and a lamp and battery casing 39 and serves to hold the upper end of the casing on the contact plate 23. A rivet 40 cooperates with the pivot pin 26 to mount the casing 39 on the contact plate 23, a suitable washer 41 being provided to properly space the lower end of the casing from the contact plate. The contact plate 23 is cut out, as shown at 42 and 43, so that the rivets 20 and 21, which hold the insulator plate 22 on the adapter plate 15, will not make electrical contact with the contact plate. An insulating bushing 44 is mounted in the upper end of the casing 39 and is adapted to receive and position a small electric lamp 45 in the upper end of the casing, insulating the lamp from the side walls of the casing. The lower end of the casing 39 is adapted to receive a flash light battery 46, which will be held in place in the casing by the engagement of the upper terminal 47 thereof with the center contact 48 of the lamp and by a resilient, pivoted, L-shaped member 49. The member 49 is pivoted on the adapter plate 13 at 50 and engages the bottom of the battery 46 to not only hold the battery in place, but to connect the lower end of the battery to the framework of the gram gauge 5, whereby the leaf spring 6 is connected to the bottom of the battery 46.

The side wall of the casing 39 is cut along the lines 70, 71 and 72 and the portion 73, thus disconnected from the remainder of the casing, is bent as shown at 74 and 75 to provide a switch for connecting the casing to the threaded side of the lamp 45. Thus, a circuit may be completed from the upper terminal 47 of the battery 46 through the center contact 48 to one side of the filament of the lamp and from the bottom of the battery 46 through member 49, adapter plate 13, scale plate 9, leaf spring 6 in engagement with either the contact 24 or contact 25, casing 39 and portion 73 through the threaded side of the lamp 45, to the other side of the lamp filament when an operator bends the portion 73 of the casing 39 into contact with the side of the lamp.

The upper end of the casing 39 has a cap 55 mounted thereon, into an aperture 56 of which a rod 57 of methyl methacrylate, commonly known by the trade names of "Lucite" or "Plexiglas" may be cemented by any suitable cement, as indicated at 58. The rod 57, preferably, is formed of two pieces of methyl methacrylate, one of which is indicated at 60 and the other at 61, the pieces 60 and 61 forming the rod 57 being bent in opposite directions and the piece 61 extending up and over the top of the scale plate 9. The material, methyl methacrylate, has the inherent characteristic of transmitting light throughout its length, the rays of light being carried through the material and being directed out the end of it. This material has, therefore, been utilized so that in using the gauge, the details of which have been described hereinbefore, an operator may use the gauge in a number of different positions, and when the leaf spring 6 is in engagement with either of the contacts 24 or 25 while the portion 73 is engaging the side of the lamp 45, the lamp will be lighted. An operator, in using the gauge described herein, may grasp the casing 39 and press the portion 73 of the casing into engagement with the threaded portion of the lamp 45 to cause the lamp circuit to be completed and the lamp to be lighted and then upon engaging the tip of the leaf spring 6 with a contact spring whose tension is to be measured, the leaf spring 6 will break contact with the horizontally extending portion 27 of the contact 24 when sufficient pressure is applied to the contact spring under test by the leaf spring 6. If the contact spring under test either opens or closes, as the case may be, with the leaf spring in between the portions 27 and 28 of the contacts 24 and 25, then the tension in a contact spring under test is within the desired limits, it being assumed that the contacts 24 and 25 have been moved across the face of the scale 10 and locked on the adapter plate 13 by means of the locking nuts 32 and 33. In using the device, the operator needs only watch the contact under test since the pieces 60 and 61 of the rod 57 are bent to throw a light toward the operator's eyes all the time the lamp 45 is lighted.

Although a specific embodiment of the invention has been described hereinbefore, it will be understood that the invention is to be limited only by the scope of the appended claims.

What is claimed is:

1. The combination with a mechanical gauge of the type having a scale plate and a leaf spring cooperating with said scale plate of an adapter plate connectible to the scale plate, a pair of contact arms mounted on the adapter plate for engagement by the leaf spring, a lamp and battery holding member on the adapter plate, a battery in said holding member, a lamp in said holding member and having one of its terminals engaging a terminal of the battery, a switch on the battery holding member for connecting the other terminal of the lamp to the contact arms, and means for connecting the other end of the battery to the leaf spring.

2. A tension gauge including a leaf spring of known tension, a scale plate positioned adjacent said leaf spring, a pair of contacts adjustable with respect to the scale plate for engagement by the leaf spring, a lamp connectible to said contacts, a battery for supplying current to said lamp when the leaf spring is in contact with either of said contacts, a manually operable switch in circuit between a terminal of the battery and a terminal of the lamp, and a pair of light conducting members positioned to direct rays of light from the lamp toward an operator using the apparatus.

3. The combination with a mechanical gauge of the type having a scale plate and a leaf spring cooperating with said scale plate, of an adapter plate detachably connectible to said scale plate through a rivet and slot connection and a pivoted L-shaped member, and an electrical signalling means supported by said adapter plate for control by the leaf spring, said electrical signalling means including a pair of contacts adjustable throughout the range of the scale on the scale plate for cooperation with the leaf spring to complete a circuit to the signalling apparatus.

4. The combination with a mechanical gauge of the type having a scale plate and a leaf spring cooperating with said scale plate, of an adapter plate connectible to said scale plate, an electrical signalling means supported by said adapter plate for control by the leaf spring, said electrical signalling means including a pair of contacts adjustable throughout the range of the scale on the scale plate for cooperation with the leaf spring to complete a circuit to the signalling apparatus, and said signalling means including means to direct a light beam toward an operator using the gauge.

5. An adapter for providing a mechanically visually readable gauge having a scale plate and a leaf spring of known tension cooperating with the scale plate with an electrical signalling means for giving a visual signal, comprising an adapter plate connectible to the mechanical gauge, a lamp and a battery mounted upon the adapter plate, one pole of said battery being connected through the adapter plate to the mechanical gauge and the other pole of the battery being connected to one terminal of the lamp, means interposable in the path of the leaf spring of the gauge and electrically connected to the other terminal of the lamp thereby to cause the lamp to be lighted when the leaf spring of the gauge is in engagement with said means interposable in its path, and means for directing light from said lamp toward an operator using the gauge

EUGENE L. MALHIOT.